Patented Aug. 24, 1948

2,447,626

UNITED STATES PATENT OFFICE 2,447,626

β-DIKETONES AND PROCESS FOR PREPARING THEM

Carl T. Bahner, Jefferson City, Tenn.

No Drawing. Application June 13, 1945,
Serial No. 599,303

11 Claims. (Cl. 260—590)

This invention relates to new reaction products of certain β-diketones with nitroolefins and to a method for preparing them. More particularly it relates to compounds having the following structural formula

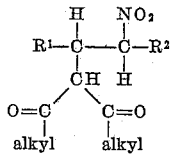

wherein $R^1$ is a radical selected from the group consisting of H, alkyl, and aryl, and $R^2$ is a radical selected from the group consisting of H and alkyl.

Among the compounds included in the above formula the following may be mentioned by way of illustration: 3-(2-nitro-1-ethyl)-2,4-pentanedione; 3-(1-nitromethylbutyl)-2,4-pentanedione; 3-(2-nitro-1-ethylbutyl)-2,4-pentanedione; 3-(2-nitrobutyl)-2,4-pentanedione; 3-(2-nitro-1-phenylethyl)-2,4-pentanedione, and the like.

In practicing my invention, I react the β-diketone with a nitroolefine in alkaline solution. I may first convert a part or all of the diketone to an alkali metal derivative for example, by dissolving sodium or potassium metal in the diketone, or I may use a basic catalyst such as an organic amine to activate the methylene hydrogen of the diketone. However, I prefer to use alkali metal derivatives of the diketone, especially in the reactions involving aliphatic nitroolefins such as 2-nitro-1-butene and 1-nitro-1-pentene and 3-nitro-3-hexene since amines tend to encourage side reactions reducing the yields of desired products and since the alkali metal derivative of the diketone produce more rapid reaction. The reaction may be carried out by utilizing equivalent proportions of the reactants, or an excess of the diketone may be used, for example, I may use an excess of the diketone as a reaction medium. Or if desired, a mutual solvent, inert to the reaction such as dioxane, and the like may be used for this purpose. The nitroolefine is preferably added portionwise to the β-diketone to prevent too violent reaction, and to reduce polymer formation, and cooling may be employed to maintain the temperature within the desired range, preferably below about 35° C. After the reactants have been mixed, the mixture is allowed to stand for a sufficient length of time to insure substantially complete reaction to take place. If the diketone is used in the form of its sodium derivative, the reaction product will be present at this point in the form of its sodium salt, and may be recovered in this form if desired. Otherwise, the mixture may be acidified at this point, for example, with acetic acid to convert the alkali metal salt to the free product. After removal of the alkali metal by-products the substituted diketone may be recovered by any desired means such as dissolving in a solvent, by distillation, by converting into other derivatives, or the like.

The β-diketones which I may use in practicing my invention have the following structural formula:

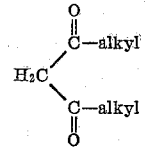

The nitroolefins which are operative in my reaction include nitroethylene and its alkyl and aryl substituted derivatives having the following formula:

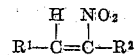

wherein $R^1$ is a radical selected from the group consisting of H, alkyl, and aryl, and $R^2$ is a radical selected from the group consisting of H, and alkyl. Among the nitroolefins included by the above formula there may be mentioned nitroethylene; 2-nitropropene; 1-nitropropene; 1-nitro-1-butene; 2-nitro-2-butene; 1-nitro-1-pentene; 3-nitro-3-hexene; 2-nitro-1-butene; 1-nitro-2-methyl-1-propene; ω-nitrostyrene, and the like.

The following specific examples will further illustrate my invention.

Example 1

Sodio acetylacetone was prepared by reacting 0.92 part sodium with 20 parts acetylacetone in 30 parts anhydrous dioxane, then 20.2 parts 1-nitro-1-butene were added in small portions, with stirring, keeping the temperature at 33–38° C. by cooling as necessary. One hour was required for the addition of the nitroolefin, then the mixture was allowed to stand one-half hour, cooled to 5° C. and acidified with glacial acetic acid. The crude product was washed well with water, and low boiling materials were removed by heating to 100° C. at 20 mm. pressure. On distillation there was obtained 12 parts of 3-(1-nitromethylpropyl)-2,4-pentanedione boiling at 114–120° C. at 2 mm. pressure. One part of this fraction was converted into the copper derivative by reacting with cupric acetate in 30% ethanol. This derivative was analyzed for copper and showed 13.6% copper as compared to a calculated value of 13.7% for $(C_9H_{14}NO_4)_2Cu$. A further portion of this fraction was purified by distillation and was found to have a refractive index $n_d^{20}=1.466$, specific gravity $d_4^{25}=1.115$. The product had the following structural formula

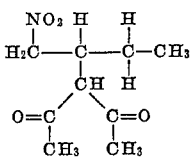

Example II

Sodio acetylacetone was prepared by mixing 0.115 part of sodium with 5 parts of acetylacetone. To the suspension thus formed 5.05 parts of 2-nitro-1-butene was added in small portions. Until near the end of the addition of 2-nitro-1-butene the temperature was kept below 30° C. Thirty minutes after the last addition the mixture was acidified with acetic acid, the product was washed several times with water, then filtered and distilled through a Vigreux column. A fraction was obtained at 108° C. and 0.5 mm. pressure having a refractive index of 1.461. This product namely, 3-(2-nitrobutyl)-2,4-pentanedione was found to have a carbon content of 53.62% as compared to a theoretical value of 53.72% and was found to have a hydrogen content of 7.35% as compared to a theoretical value of 7.51%. The structure of the compound is given below:

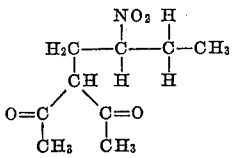

Example III

To 5 parts acetylacetone was added 0.046 part of sodium. After this had reacted 7.5 parts of ω-nitrostyrene were added in several portions. A solid mass formed and this was dissolved in hot absolute alcohol. On cooling, 7.5 parts of white, needle shaped crystals were obtained. The white crystals were recrystallized several times from absolute alcohol, and resulted in 1.9 parts of product namely, 3-(2-nitro-1-phenylethyl)-2,4-pentanedione. Analysis showed a carbon content of 62.52%, hydrogen 5.83%, nitrogen 5.16% as compared to theoretical values of C=62.64%, H=6.06%, N=5.63%, for the formula $C_{13}H_{15}NO_4$. The product has the structure given below.

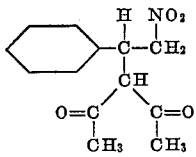

While the above describes the preferred embodiments of my invention it will be understood that departures may be made therefrom within the scope of the specification and claims.

What is claimed is:

1. 3-(1-nitromethylpropyl)-2,4-pentanedione.
2. 3-(2-nitro-1-phenylethyl)-2,4-pentanedione.
3. 3-(2-nitrobutyl)-2,4-pentanedione.
4. In a process for preparing 3-(1-nitromethylpropyl)-2,4-pentanedione, the steps which comprise mixing an alkali metal salt of acetylacetone with 1-nitro-1-butene in the liquid phase at a temperature below about 38° C.
5. In a process for preparing 3-(2-nitro-1-phenylethyl)-2,4-pentanedione, the steps which comprise mixing at room temperature an alkali metal salt of acetylacetone with ω-nitrostyrene in the liquid phase.
6. In a process for preparing 3-(2-nitrobutyl)-2,4-pentanedione, the step which comprises mixing an alkali metal salt of acetylacetone with 2-nitro-1-butene in the liquid phase at a temperature below about 30° C.
7. As new compositions of matter, the substituted diketones having the following structural formula:

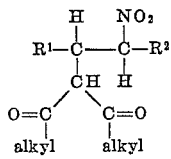

wherein $R^1$ is a radical selected from the group consisting of H, alkyl, and aryl, and $R^2$ is a radical selected from the group consisting of H and alkyl.

8. In a process for preparing substituted beta-diketones having the following structural formula:

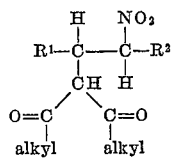

wherein $R^1$ is a radical selected from the group consisting of H, alkyl, and aryl, and $R^2$ is a radical selected from the group consisting of H and alkyl, the steps which comprise mixing in an alkaline solution a beta-diketone having the following formula:

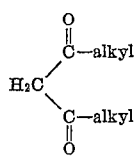

with a nitroolefin having the formula:

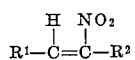

wherein the R substituents are as described above.

9. In a process for preparing substituted beta-diketones having the following structural formula:

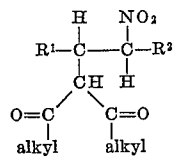

wherein $R^1$ is a radical selected from the group consisting of H, alkyl, and aryl, and $R^2$ is a radical selected from the group consisting of H and alkyl, the steps which comprise preparing an alkali metal derivative of a beta-diketone having the following structural formula:

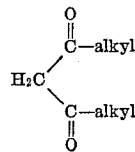

and mixing the resulting derivative with a nitroolefin having the following structural formula:

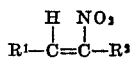

wherein the R substituents are as described above.

10. In a process for preparing substituted beta-diketones having the following structural formula:

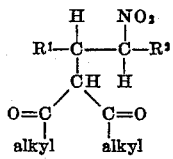

wherein $R^1$ is a radical selected from the group consisting of H, alkyl, and aryl, and $R^2$ is a radical selected from the group consisting of H and alkyl, the steps which comprise mixing at a temperature not in excess of about 38° C. an alkali metal salt of a beta-diketone having the following structural formula:

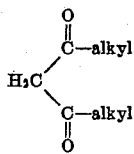

with a nitroolefin having the structure:

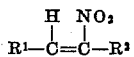

wherein the R substituents are as described above.

11. The process of claim 8 in which the beta-diketones and the nitroolefin are mixed in the alkaline solution at a temperature not in excess of about 38° C.

CARL T. BAHNER.

REFERENCES CITED

The following references are of record in the file of this patent:

UNITED STATES PATENTS

| Number | Name | Date |
|---|---|---|
| 2,073,363 | Carothers | Mar. 9, 1937 |